US010999760B2

(12) United States Patent
Liu et al.

(10) Patent No.: US 10,999,760 B2
(45) Date of Patent: May 4, 2021

(54) COLLECTIVE INTELLIGENCE-BASED CELL CONGESTION DETECTION IN MOBILE TELECOMMUNICATIONS NETWORKS

(71) Applicant: AT&T Intellectual Property I, L.P., Atlanta, GA (US)

(72) Inventors: Zhengye Liu, Pleasanton, CA (US); Donglin Hu, Dublin, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/408,013

(22) Filed: May 9, 2019

(65) Prior Publication Data

US 2020/0359256 A1  Nov. 12, 2020

(51) Int. Cl.
*H04W 28/02* (2009.01)
*H04W 40/02* (2009.01)
*H04W 28/08* (2009.01)
*H04L 12/803* (2013.01)

(52) U.S. Cl.
CPC ....... *H04W 28/0289* (2013.01); *H04L 47/122* (2013.01); *H04W 28/0231* (2013.01); *H04W 28/0284* (2013.01); *H04W 28/08* (2013.01); *H04W 40/023* (2013.01)

(58) Field of Classification Search
None
See application file for complete search history.

(56) References Cited

U.S. PATENT DOCUMENTS

| | | | |
|---|---|---|---|
| 2015/0103657 A1* | 4/2015 | Henderson | H04W 28/08 370/232 |
| 2017/0078922 A1* | 3/2017 | Raleigh | H04W 28/10 |
| 2017/0126314 A1* | 5/2017 | Prakash | H04L 49/357 |
| 2017/0318479 A1* | 11/2017 | Cotanis | H04L 43/16 |
| 2018/0137757 A1* | 5/2018 | Maertens | G08G 1/0141 |
| 2020/0028782 A1* | 1/2020 | Li | H04L 47/12 |
| 2020/0112876 A1* | 4/2020 | Sridhar | H04L 41/5019 |
| 2020/0126187 A1* | 4/2020 | Park | H04L 65/80 |
| 2020/0205174 A1* | 6/2020 | Prasad | H04W 72/1231 |

\* cited by examiner

*Primary Examiner* — Otis L Thompson, Jr.
(74) *Attorney, Agent, or Firm* — Hartman & Citrin LLC

(57) ABSTRACT

Concepts and technologies disclosed herein are directed to collective intelligence-based cell congestion detection in mobile telecommunications networks. According to some aspects of the concepts and technologies disclosed herein, a core network element or device application can detect cell congestion based upon Internet layer, transport layer, and application layer data, such as, for example, traffic type, volume, rate, latency, jitter, and the like. According to one aspect disclosed herein, a cell congestion detection ("CCD") system can collect data from an Internet layer, a transport layer, and an application layer. The CCD system can apply a machine learning algorithm to the data to determine whether the cell is congested. According to another aspect the CCD system can collect the data that is associated with a specific application executed by a plurality of UE devices connected to a cell.

14 Claims, 9 Drawing Sheets

COLLECTIVE INTELLIGENCE-BASED CELL CONGESTION DETECTION IN MOBILE TELECOMMUNICATIONS NETWORKS

BACKGROUND

Cell congestion is a critical event that requires careful management by mobile network operators to ensure network users receive a satisfying Quality of Experience ("QoE") via their user equipment ("UE") devices. When a cell is congested (i.e., the cell has reached a threshold capacity of maximum load or other threshold value established by the mobile network operator), the current expectation is that users will unfortunately experience at least some degradation in terms of QoE. In order to properly manage a congested cell, mobile network operators typically take action to mitigate the congestion. Some common mitigation actions include offloading traffic from any congested cell(s) to one or more neighbor cells; adding one or more new cells and offloading traffic from any congested cell(s) the new cell(s); and/or throttling network traffic that traverses the congested cell(s).

Due to the expense and complexity of adding new cells and offloading traffic from any congested cell(s) to the new cell(s) and/or to one or more neighbor cells of the congested cell(s), many mobile network operators often use throttling mechanisms to at least partially mitigate cell congestion issues. When using a throttling mechanism, the mobile network operator utilizes a core network element (e.g., a network optimization proxy) to identify whether a cell is congested, and if the cell is congested, to determine how congested the cell is and to find the proper treatment to treat the traffic that traverses the congested cell.

Detecting cell congestion is equally important for application service providers such as YouTube, Facebook, NETFLIX, and the like because their applications need to handle congested cells to provide satisfying QoE for their users. For example, when a video streaming application detects that the connected cell is congested, the application typically adapts to a conservative transmission strategy by reducing video rate to avoid worsening the congestion.

Detecting if a cell is congested and determining the corresponding congestion level from a core network element and/or an application is challenging, and mobile network operators and application service providers are not currently equipped with the technologies necessary to implement congestion detection from these resources. This is because neither the core network element nor the application has explicit cell load information (e.g., physical resource block utilization, etc.).

SUMMARY

Concepts and technologies disclosed herein are directed to aspects of collective intelligence-based cell congestion detection in mobile telecommunications networks. According to some aspects of the concepts and technologies disclosed herein, a core network element or device application can detect cell congestion based upon Internet layer, transport layer, and application layer data, such as, for example, traffic type, volume, rate, latency, jitter, and the like.

According to one aspect disclosed herein, a cell congestion detection ("CCD") system can collect data from an Internet layer, a transport layer, and an application layer. The CCD system can apply a machine learning algorithm to the data to determine whether the cell is congested.

In some embodiments, the CCD system is implemented in a core network element, such as an element operating as part of an evolved packet core ("EPC") or other core network of the mobile telecommunications network. In these embodiments, network traffic of the mobile telecommunications network can be routed through the core network element. The core network element can identify which traffic flows of the network traffic are from which cells of the mobile telecommunications networks, wherein a specific traffic flow of the network traffic is associated with the cell to which the plurality of UE devices are connected. Moreover, in these embodiments, the CCD system can determine, based upon an output of the machine learning algorithm, that the cell is operating with a cell load at or above a congestion threshold. In response to determining that the cell is operating with the cell load at or above the congestion threshold, the CCD system can apply a traffic treatment to the specific traffic flow associated with the cell to mitigate the cell load. Mitigation of the cell load can include at least reducing the cell load below the congestion threshold, although the effectiveness of a mitigation solution is highly dependent upon the circumstances of a given situation. The mobile network operator is best-suited for making decisions regarding how cell congestion mitigation is implemented, and as such, the particular congestion mitigation techniques disclosed herein should not be construed as being limiting in any way.

In some embodiments, the CCD system is implemented in an application server that provides server-side functionality of a specific application, the client-side portion of which can be executed by each of the plurality of UE devices. Use of the specific application can identify the cell of the mobile telecommunications network. The CCD system can determine that, based upon an output of the machine learning algorithm, the cell is operating with a cell load at or above a congestion threshold. In response to determining that the cell is operating with the cell load at or above the congestion threshold, the CCD system can determine one or more recommended actions to be taken by at least one of the plurality of user equipment devices to mitigate the cell load. The CCD system can send the recommended action(s) to the UE device(s). The UE device(s) can perform the recommended action(s) to mitigate the cell load.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
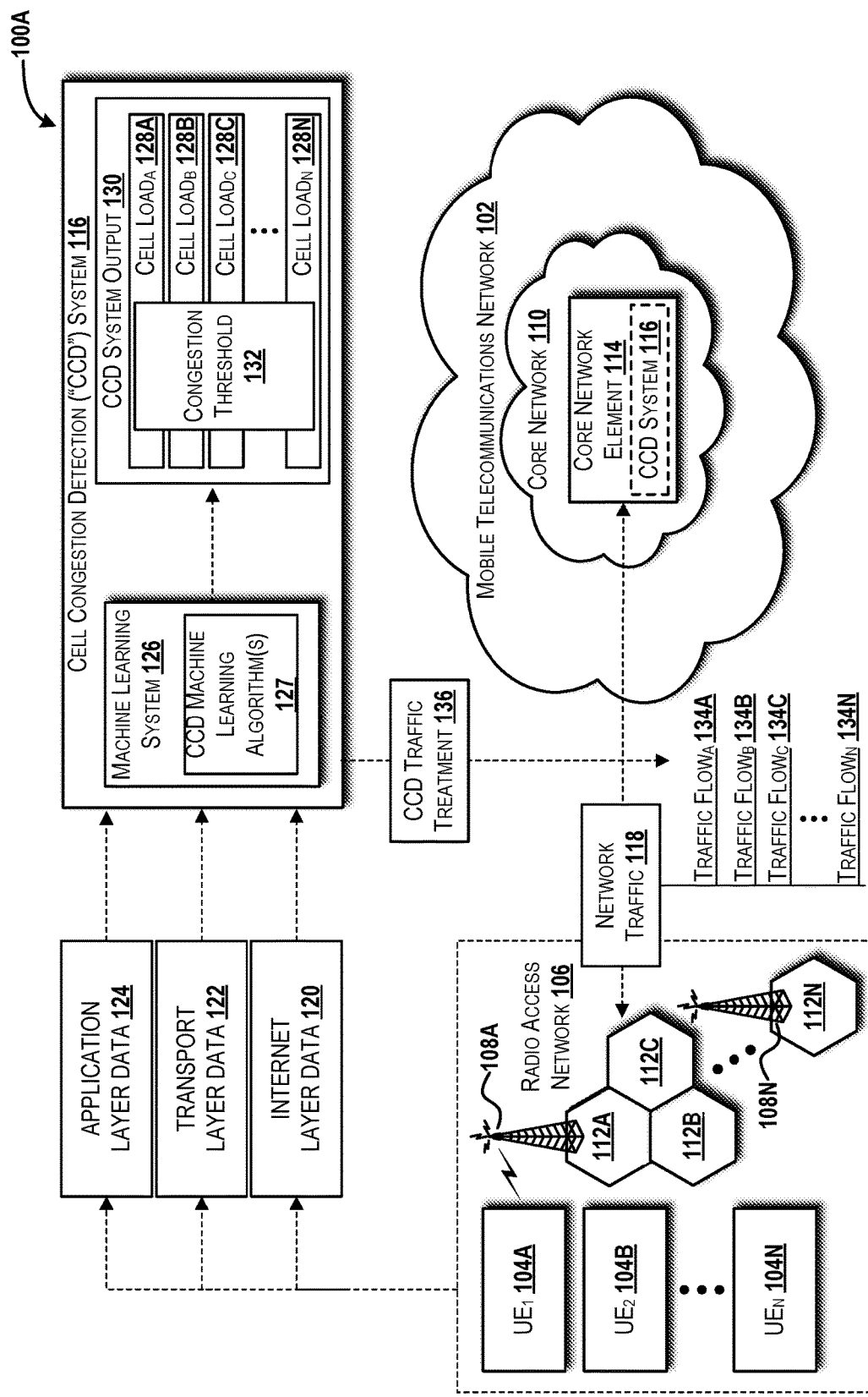
FIGS. 1A and 1B are block diagrams illustrating aspects of illustrative operating environments for various concepts and technologies disclosed herein.

The concepts and technologies disclosed herein provide a collective-intelligence approach to detect cell congestion, using statistics collected from Internet layer and above layers in the Transfer Control Protocol ("TCP")/Internet Protocol ("IP") networking model. Individual user equipment ("UE") devices and the applications running on these devices connected to a single cell can jointly sense the load of the cell, and based upon such collective data, cell congestion detection machine learning algorithms can be applied to classify if a cell is congested, and if the cell is congested, how severe the congestion is. The collective-intelligence approach to detect cell congestion provides high detection accuracy that can be validated based upon actual network data derived from lower layer radio access network ("RAN") reported cell load, which is not visible to the core network.

The concepts and technologies disclosed herein provide an approach to identify cell congestions in mobile telecommunications networks (e.g., a Long-Term Evolution "LTE" network). Since the approach is based on data and statistics from the Internet layer and above layers in the TCP/IP networking model, while not relying on underlying layers, including the physical layer for example, the disclosed approach can be immediately applied to other mobility networks, including next generation networks such as 5G networks.

A mobile network operator typically identifies cell congestion based on the data and statistics reported directly from base stations operating in a RAN, on the lower layers, including the physical layer, MAC layer, etc. An advantage to this approach is that the mobile network operator can obtain cell load information explicitly and accurately. However, for the use case described in the Background, if a core network element needs to apply traffic treatment, it can be challenging for the core network element to access such data, so that the traffic treatment does not take cell congestion into account, which is highly undesirable. To solve this problem, a standalone data service is needed, whereby the service injects base station data to generate cell load key performance indicators ("KPIs"), and to feed the KPIs to the core network element. Unlike the solution with a standalone data service, the proposed approach in this disclosure is an inline solution, where the core network element uses its own data from the Internet layer and above layers to identify cell congestion.

Application service providers, such as, for example, social media service providers (e.g., YouTube, Facebook, Twitter, and the like), online shopping service providers, real-time streaming service providers (e.g., video, audio, and/or gaming), and the like, typically cannot directly receive data from base stations, and therefore the device applications used by these service providers typically cannot use cell congestion explicitly. This simplifies application development but sacrifices application QoE, especially for delay and throughput-sensitive applications such as real-time streaming, like video streaming. Typically, an application is programmed to use built-in TCP congestion control to handle cell congestion, without requiring special treatment. However, as those skilled in the art will understand, existing TCP congestion control is not optimal or particularly effective for use in a wireless telecommunications environment. For example, an application cannot identify the condition of a congested cell from poor radio frequency ("RF") conditions, thus leading to a sub-optimal congestion control action. This is also true for applications that utilize User Datagram Protocol ("UDP") and application layer congestion control. Aspects of the concepts and technologies disclosed herein provide a better solution to identify cell congestion and RF degradation to take more specific and suitable actions. For example, under the condition of a congested cell with good RF conditions, it is more desirable for an application to take a more conservative action (e.g., by reducing the video rate); while under the condition of an under loaded cell with poor RF, it is more desirable for an application to take a more aggressive action to obtaining more RF resources.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1A, an operating environment 100A in which embodiments of the concepts and technologies disclosed herein will be described. The illustrated operating environment 100A includes a mobile telecommunications network 102 operated, at least in part, by one or more mobile network operators (not shown) to provide one or more mobile telecommunications services, such as voice and/or data mobile telecommunications services, to a plurality of user equipment ("UE") devices 104A-104N (hereinafter, at times, referred to collectively as "UEs 104 or UE devices 104" or individually as "UE 104 or UE device 104"). The mobile telecommunications network 102 can be a single network or combination of multiple networks that utilize any wireless communications technology or combination of wireless communications technologies to provide the mobile telecommunications service(s) to the UE devices 104.

The functionality of the UE devices 104 can be provided by one or more mobile telephones, smartphones, tablet computers, slate computers, smart watches, smart glasses, other wearable devices, other smart devices, Internet of Things ("IoT") devices, security devices, media playback devices, video game systems, navigation devices, connected cars, infotainment systems, laptop computers, notebook computers, ultrabook computers, netbook computers, computers of other form factors, computing devices of other form factors, other computing systems, other computing devices, and/or the like that include one or more radio access components (best shown in FIG. 5) that is/are capable of connecting to and communicating with one or more radio access networks ("RANs") 106, although, in the illustrated embodiment, only a single RAN 106 is shown for ease of illustration. It should be understood that the functionality of each of the UE devices 104 can be provided by a single device, by two or more similar devices, and/or by two or more dissimilar devices. An example architecture that can be utilized by the UE devices 104 in context of a mobile telephone or smartphone is illustrated and described herein with reference to FIG. 5.

In some embodiments, the UE device 104 can include an integrated or external radio access component that facilitates wireless communication with the RAN 106. The radio access component may be a cellular telephone that is in wired or wireless communication with the UE device 104 to facilitate a tethered data connection to the RAN 106. Alternatively, the radio access component may include a wireless transceiver configured to send data to and receive data from the RAN 106 and a universal serial bus ("USB") or another communication interface for connection to the UE device 104 so as to enable tethering. In any case, the UE device 104 can wirelessly communicate with the RAN 106 over a radio/air interface between the radio access component(s) of the UE device 104 and one or more base stations 108A-108N (hereinafter, at times, referred to collectively "base stations 108" or individually as "base station 108").

As used herein, a "base station" refers to a radio transceiver that is configured to provide a radio/air interface over which one or more of the UE devices 104 can connect to the mobile telecommunications network 102. Accordingly, a base station is intended to encompass one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes that are capable of providing a radio/air interface regardless of the radio access technology ("RAT") utilized to do so. As used herein, a "RAT" refers to any mobile telecommunications standard or draft standard thereof, any IEEE 802.11 standard or draft standard thereof, or any other technology by which one or more of the UE devices 104 can utilize radio waves to wirelessly connect to a network such as the RAN 106. A base station can be in communication with one or more antennas (not shown), each of which may be configured in accordance with any antenna design specifications to provide a physical interface for receiving and transmitting radio waves to and from one or more devices, such as the UE device(s) 104.

The RAN 106 may operate in accordance with one or more mobile telecommunications standards, including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. The RAN 106 may utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide the radio/air interface to the UE devices 104. Data communications can be provided in part by the RAN 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like.

The illustrated mobile telecommunications network 102 can include one or more RANs, such as the RAN 106, and a wireless wide area network ("WWAN"). The WWAN can utilize one or more mobile telecommunications technologies, such as those described above, to provide voice and/or data services via the RAN 106 to one or more radio access components of the UE devices 104. Moreover, the mobile telecommunications network 102 can provide a connection to the Internet or other networks (not shown in FIG. 1A) so that the UE devices 104 can access Internet content, such as, for example, websites, streaming media, online video games, downloadable content, and the like.

The mobile telecommunications network 102 can include one or more core networks 110, such as, for example, a circuit-switched core network ("CS CN"), a packet-switched core network ("PS CN"), and/or an IP multimedia subsystem ("IMS") core network. In embodiments in which the mobile telecommunication network 102 supports, at least in part, LTE, the core network 110 can be or can include an evolved packet core ("EPC") network with which the UE devices 104 are in communication via the RAN 106 embodied as an E-UTRAN, wherein the base stations 108A-108N are eNode-Bs, each of which serves an area shown, in the illustrated example, as corresponding to one of a plurality of cells 112A-112N (hereinafter, at times, referred to collectively as "cells 112" or individually as "cell 112").

The cells 112 can be uniquely identified by a cell identifier ("cell ID") so as to allow the mobile telecommunications network 102 to distinguish among the cells 112 for purposes of isolating which of the cells 112 are operating in a congested state. The cells 112 can have the same or different cell sizes, which may be represented, for example, by different cell-types. A cell-type can be associated with certain dimensional characteristics that define the effective radio range of the base station 108 that serves the cell 112. A cell-type can additionally represent the RAT utilized by a cell. Cell-types can include, but are not limited to, a macro cell-type, a metro cell-type, a femto cell-type, a pico cell-type, a micro cell-type, a wireless local area network ("WLAN") cell-type, a MSMC cell-type, and a white space network cell-type. For ease of explanation, a "small cell" cell-type can collectively refer to a group of cell-types that includes femto cell-type (e.g., home eNodeB), pico cell-type, and micro cell-type, in general contrast to a macro cell-type, which offers a larger coverage area. Although aspects of the concepts and technologies disclosed herein are primarily focused on macro cell-types, those skilled in the art will appreciate the applicability of the concepts and technologies disclosed herein to other cell-types disclosed herein, including small cell-types, proprietary cell-types, temporary cell-types, ad-hoc cell-type, and others known to those skilled in the art. An ad-hoc cell-type, for example, can include a mobile device, such as the UE device 104, functioning as a "hotspot" for facilitating connectivity for other devices to connect to another potentially larger cell. It should be understood that implementations of the operating environment 100A may include any number of base stations 108 and corresponding cells 112. Moreover, each cell 112 is not limited to one base station 108, and each base station is not limited to providing radio access to the RAN 106 via one RAT. As such, the illustrated example should not be construed as being limiting in any way.

The core network 110 can include one or more core network elements 114, such as, but not limited to, systems, servers, proxies, location centers, gateways, networking elements, other entities and the like. In some embodiments, the core network 110 is or includes an EPC network, and in these embodiments, the core network 110 can include, in particular, one or more mobility management entities ("MME"), one or more application servers ("AS"), one or more home subscriber servers ("HSS"), one or more evolved serving mobile location centers ("ESMLC"), one or more gateway mobile location centers ("GMLC"), one or more serving gateways ("SGW"), one or more packet data network gateways ("PGWs"), some combination thereof, and/or the like. These network functions can be implemented as physical network functions ("PNFs") having hardware and software components. The core network elements 114 can additionally or alternatively be provided, at least in part, by virtual network functions ("VNFs"). For example, the core network elements 114 can be realized as VNFs that utilize a unified commercial-off-the-shelf ("COTS") hardware and flexible resources shared model with the application software for the respective core network elements 114 running on one or more virtual machines ("VMs"). An example cloud computing platform architecture that might be used to implement various core network elements 114 embodied as VNFs is described herein below with reference to FIG. 7. Moreover, the core network elements 114 can be embodied as VNFs in one or more VNF pools, each of which can include a plurality of VNFs providing a particular core network function. The core network element 114 should be construed as being representative of a single element, a combination of co-located elements that provide the functionality of the core network element 114, or distributed core network elements 114 in which resources, such as from a cloud computing platform (see FIG. 7), can be allocated as needed to enable the functionality of the core network element 114 across the mobile telecommunications network 102 in accordance with the concepts and technologies disclosed herein. As such, the illustrated single core network element 114 should not be construed as being limiting in any way.

An SGW can transport Internet Protocol ("IP") data traffic between the UE devices 104 and one or more external networks, such as, for example, an IP multimedia subsystem ("IMS") network (not shown). The SGW can connect the RAN 106 to the core network 110 to allow IP data communications between the UE devices 104 and the core network 110. The SGW also performs operations to facilitate handover among eNBs, such as the base stations 108, within the RAN 106 and between other access networks (not shown). The SGW can be in communication with a PGW that interconnects the core network 110 and external IP networks (i.e., PDNs —not shown). The PGW can transport IP packets to and from the PDNs. The PGW also performs operations such as IP address/IP prefix allocation, policy control, and charging. In some implementations, the PGW and the SGW are combined. An HSS is a database that contains user/subscriber information. The HSS also performs operations to support mobility management, call and session setup, user authentication, and access authorization.

In the illustrated embodiment, the core network element 114 includes a cell congestion detection ("CCD") system 116. In some embodiments, the core network element 114 can be or can include an SGW that, in turn, includes the CCD system 116 or the functionality thereof as described herein. Alternatively, the CCD system 116 can be a standalone core network element in the core network 110. The CCD system 116, operating in or as part of the core network element 114, can monitor all or at least a portion of network traffic 118 associated with communications between the UE devices 104 and the mobile telecommunications network 102 to detect whether one or more of the cells 112 is congested based, at least in part, upon data collected from the Internet layer and above layers in the TCP/IP networking model. This data is illustrated as Internet layer data 120, transport layer data 122, and application layer data 124. Since the CCD system 116 only considers data from the Internet layer and above layers of the TCP/IP networking model, and does not consider data from lower layers such as the data link and physical layer, the CCD system 116 can be immediately applied to new networks that utilize new mobile telecommunications technologies without disruption to services, such as when the mobile telecommunications network 102 is upgraded to support future generation technology standards, an example of which being the current transition from 4G LTE-based 3GPP technology standards to 5G 3GPP technology standards.

A mobile network operator typically identifies cell congestion based upon the data reported directly from base stations. For example, the base stations 108 operating in the RAN 106 can report cell congestion on the lower layers of the TCP/IP model, including the data link (e.g., Media Access Control "MAC" layer) and the physical layer. Using this method, the mobile network operator can obtain cell load information explicitly and accurately, but if a traffic treatment needs to be applied, such as by an EPC element in an existing LTE network infrastructure, the EPC element cannot access data from the data link and physical link layers. For this reason, any traffic treatment applied by the EPC element will not take into account cell congestion, which is highly undesirable for the mobile network operator. A current method to solve this problem is to use a standalone data service that injects base station data to generate cell load KPIs and to feed the cell load KPIs to the EPC element. Unlike a standalone data service, the concepts and technologies disclosed herein provide, in the illustrated embodiment of FIG. 1A, an inline solution, where the core network 110 includes the core network element 114 that, in turn, includes the CCD system 116, which utilizes a machine learning system 126 to collect the Internet layer data 120, the transport layer data 122, and the application layer data 124 from the UE devices 104 and apply thereto one or more CCD machine learning algorithms 127 to identify cell congestion among one or more of the cells 112 of the RAN 106.

In the illustrated embodiment, the CCD system 116 can collect, from the UEs 104 connected to the cells 112, the Internet layer data 120, the transport layer data 122, and the application layer data 124 from the network traffic 118. The CCD system 116 can utilize the machine learning system 126 to apply the CCD machine learning algorithm(s) 127 to the collected data to determine cell loads 128A-128N (hereinafter, at times, referred to collectively as "cell loads 128" or individually as "cell load 128") corresponding to the cells 112A-112N, respectively. The CCD system 116 can output the cell loads 128 as a CCD system output 130 with an indication of whether each of the cells 112 is operating at or above a congestion threshold 132.

The cell loads 128 can be based upon one or more cell load KPIs, some examples of which include, but are not limited to, round trip time ("RTT"), throughput, and retransmission rate. Those skilled in the art will appreciate other KPIs that can be used to assess the cell loads 128, and as such, the KPIs disclosed herein should not be construed as being limiting in any way.

The congestion threshold 132 can be associated with any one cell load KPI or combination of cell load KPIs. The congestion threshold 132 can be static or dynamic. A static congestion threshold 132 is applied the same across all conditions such as time of day. A dynamic congestion threshold 132 can have different threshold values for different conditions such as one value for a first time of day and a second value for a second time of day. The congestion threshold 132, whether the congestion threshold 132 is static or dynamic, the cell load KPIs used, and the type of threshold used (e.g., percentage, percentile, etc.), can be selected by the mobile network operator based upon the needs of a given implementation, and as such, any specific example congestion thresholds 132 disclosed herein should not be construed as being limiting in any way.

In the illustrated embodiment, the mobile telecommunications network 102 can route at least a portion of the network traffic 118 associated with the UE devices 104 through the core network element 114. The core network element 114 can identify, from the network traffic 118, which of a plurality of traffic flows 134A-134N of the network traffic 118 are from which of the cells 112A-112N of the RAN 106, and based upon the data (i.e., the Internet layer data 120, the transport layer data 122, and the application layer data 124) collected from the traffic flows 134A-134N, the CCD system 116 can determine whether a given traffic flow 134 is indicative of the corresponding cell 112 (e.g., the traffic flow$_A$ 134A corresponding to the cell 112A) being in a congested state having the cell load$_A$ 128A that at least meets the congestion threshold 132. For example, in response to determining that the cell$_A$ 112A is operating with the cell load 128A at or above the congestion threshold 132 (e.g., 90% of maximum cell load), the CCD system 116 can determine a CCD traffic treatment 136 that can mitigate the cell load$_A$ 128A, such as to reduce the cell load$_A$ 128A below the congestion threshold 132. The CCD system 116 can then apply the CCD traffic treatment 136 to the traffic flow$_A$ 134A to mitigate the cell load$_A$ 128A. The CCD traffic treatment 136 can include rerouting the network traffic 118 associated with the traffic flow$_A$ 134A to one or more neighboring cells, such as the cell$_B$ 112B and/or the cell$_C$ 112C, and/or to one or more new cells (not shown). Other traffic treatments, such as throttling, are contemplated, such as, but not limited to, throttling, allocating different QoS with network slicing, different queue management schemes, different transport layer schemes, such as TCP congestion control schemes, combinations thereof, and/or the like.

The ability to detect cell congestion is beneficial for mobile network operators. The implementation described above with reference to FIG. 1A enables mobile network operators to implement collective intelligence-based cell congestion detection in mobile telecommunications networks such as the mobile telecommunication network 102. The ability to detect cell congestion also is beneficial for application service providers, such as social media service providers (e.g., YouTube, Facebook, Twitter, and the like), online shopping service providers, real-time streaming (e.g., video, audio, and/or gaming), and the like. These service providers typically cannot directly receive data from base stations, such as the base stations 108, and therefore the device applications these service providers provide to allow users to access their services cannot use cell congestion data explicitly. This simplifies application development for the service provider but sacrifices application QoE, especially for delay and throughput-sensitive applications such as real-time streaming applications. An application typically uses built-in TCP congestion control to manage cell congestion, without special treatment. However, as those skilled in the art will understand, existing TCP congestion control is not optimal or particularly effective for use in a wireless telecommunications environment, such as provided by the mobile telecommunications network 102 via the RAN 106. For example, an application cannot identify the condition of a congested cell from poor RF conditions, thus leading to a sub-optimal congestion control action. This is also true for applications that utilizes UDP and application layer congestion control. The concepts and technologies now introduced in FIG. 1B below provide a better solution to identify cell congestion and RF degradation to take more specific and suitable actions. For example, under the condition of a congested cell with good RF conditions, it is more desirable for an application to take a more conservative action (e.g., by reducing the video rate); while under the condition of an under loaded cell with poor RF, it is more desirable for an application to take a more aggressive action to obtaining more RF resources.

Figure 1B:
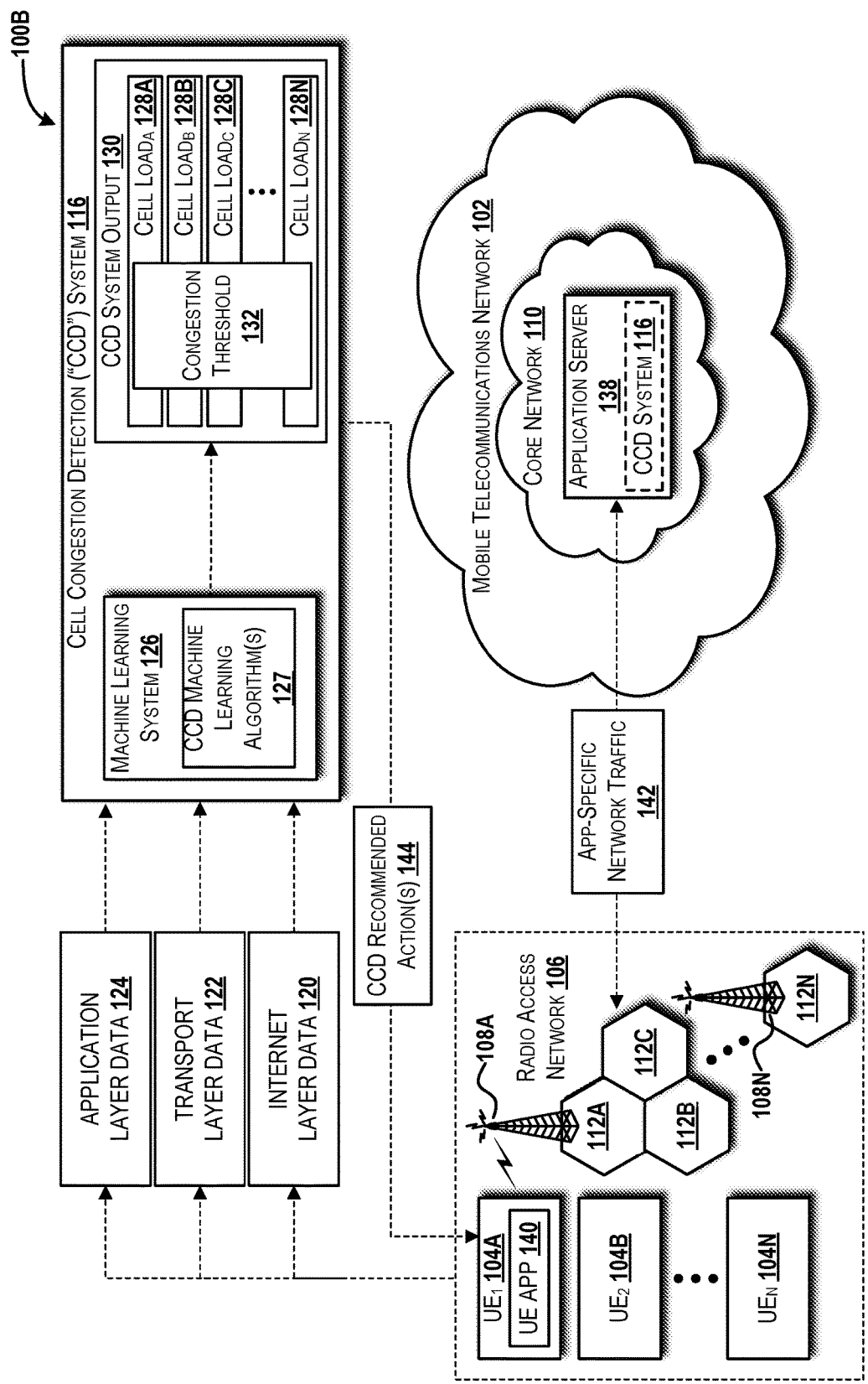

Turning now to FIG. 1B, an operating environment 100B in which embodiments of the concepts and technologies disclosed herein will be described. The illustrated operating environment 100B includes the mobile telecommunications network 102, the UE devices 104, the RAN 106, the base stations 108, the core network 110, the cells 112, the CCD system 116, the Internet layer data 120, the transport layer data 122, the application layer data 124, the machine learning system 126, the CCD machine learning algorithm(s) 127, the cell loads 128, the CCD system output 130, and the congestion threshold 132, introduced above with reference to the operating environment 100A in FIG. 1A. In addition, the operating environment 100B includes an application server 138 and an associated device-side application ("UE application") 140, which is shown, as an example, executing on the UE device$_1$ 104A, but alternatively can be implemented in any number of the UE devices 104 served by the application server 138.

The application server 138 can provide service functionality associated with any application service, such as a social media service (e.g., YouTube, Facebook, Twitter, and the like), online shopping service, banking service, real-time streaming service (e.g., video, audio, and/or gaming), and the like. The application server 138 can communicate with the UE application 140 via the mobile telecommunications network 102 to allow users access to the application service from the UE application 140 via communications with the application server 138, such as in a client-server model. The UE application 140 can be stored in a memory component (best shown in FIG. 5) of the UE device 104 and can be executed by one or more processing components (also best shown in FIG. 5) of the UE device 104.

The illustrated application server 138 includes the CCD system 116 to facilitate cell load congestion detection via the application server 138. In the illustrated embodiment, application-specific network traffic 142 associated with communications (e.g., requests/responses, messages, data, other communications, and the like) between the UE application 140 and the application server 138 via the mobile telecommunications network 102 are routed through the application server 138. The UE application 140, being executed by the UE device 104, can identify to which cell 112 the UE device 104 is connected—for example, the $UE_1$ 104A is connected to the $cell_A$ 112A in FIG. 1B—and can provide the cell ID or other information to inform the application server 138 of the cell 112 to which the UE device 104 is connected. The application server 138 can utilize the machine learning system 126 to apply the CCD machine learning algorithm(s) 127 to the Internet layer data 120, the transport layer data 122, and the application layer data 124 collected from the application-specific network traffic 142 to determine the cell $load_A$ 128A corresponding to the $cell_A$ 112A. The CCD system 116 can output the cell $load_A$ 128A as the CCD system output 130 with an indication of whether each of the $cell_A$ 112$_A$ is operating at or above the congestion threshold 132. In response to determining that the $cell_A$ 112A is operating with the cell $load_A$ 128A at or above the congestion threshold 132, the CCD system 116 can determine one or more CCD recommended actions 144 to be taken by the $UE device_1$ 104A to mitigate the cell load 128A, such as to reduce the cell load 128A below the congestion threshold 132. The CCD system 116 can send the CCD recommended action(s) 144 to the $UE device_1$ 104A. The $UE device_1$ 104A can then carry out the CCD recommended action(s) 144 to mitigate the cell $load_A$ 128A, thereby improving the QoE for users of the application service provided by the application server 138 via the UE application 140 executed by the UE devices 104.

Figure 2:
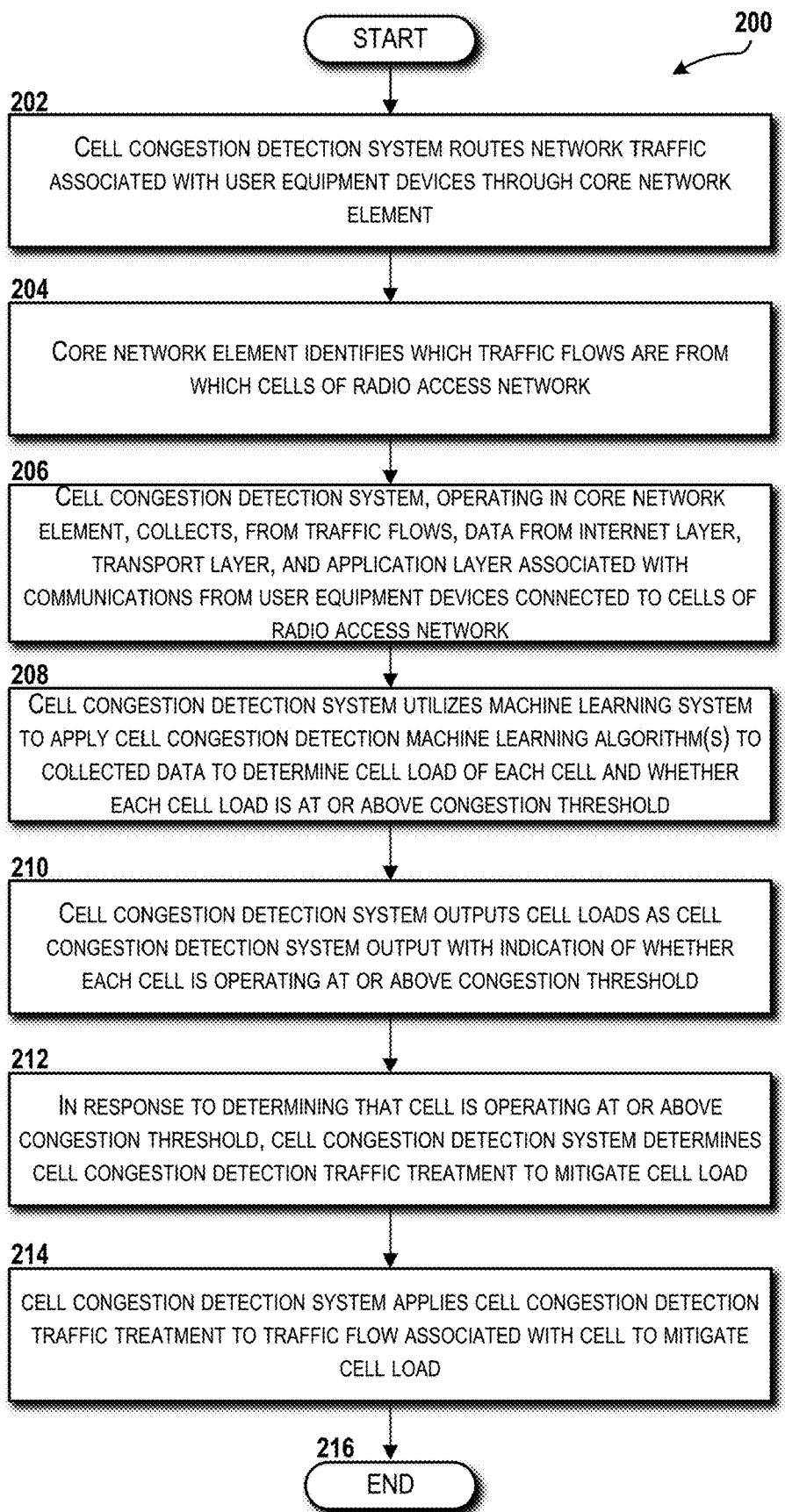
FIG. 2 is a flow diagram illustrating aspects of a method for collective intelligence-based cell congestion detection in a mobile telecommunications network based upon a cell congestion detection system operating in a core network element, according to an illustrative embodiment.

Turning now to FIG. 2, a flow diagram illustrating aspects of a method 200 for collective intelligence-based cell congestion detection in the mobile telecommunications network 102 based upon the CCD system 116 operating in the core network element 114 will be described according to an illustrative embodiment. FIG. 2 will be described with additional reference to FIG. 1A. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the core network element 114, the CCD system 116, or the application server 138, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1A. The method 200 begins and proceeds to operation 202, where the CCD system 116 routes at least a portion of the network traffic 118 associated with the UE devices 104 through the core network element 114. From operation 202, the method 200 proceeds to operation 204, where the core network element 114 identifies, from the network traffic 118, which of the traffic flows 134 are from which of the cells 112 of the RAN 106. From operation 204, the method 200 proceeds to operation 206, where the CCD system 116, operating in the core network element 114, collects, from the traffic flows 134A-134N, the Internet layer data 120, the transport layer data 122, and the application layer data 124 associated with communications from the UE devices 104 connected to the cells 112A-112N, respectively, of the RAN 106.

From operation 206, the method 200 proceeds to operation 208, where the CCD system 116, operating in the core network element 114, utilizes the machine learning system 126 to apply the CCD machine learning algorithm(s) 127 to the data collected at operation 206 to determine the cell load 128 of each of the cells 112 and whether each of the cells 112 is operating at or above the congestion threshold 132. From operation 208, the method 200 proceeds to operation 210, where the CCD system 116 outputs the cell loads 128 as the CCD system output 130 with an indication of whether each of the cells 112 is operating at or above the congestion threshold 132.

From operation 210, the method 200 proceeds to operation 212, where, in response to determining that a specific cell (e.g., the $cell_A$ 112A) is operating at or above the congestion threshold 132, the CCD system 116 determines the CCD traffic treatment 136 to be used to mitigate the cell $load_A$ 128A corresponding to the $cell_A$ 112A. From operation 212, the method 200 proceeds to operation 214, where the CCD system 116 applies the CCD traffic treatment 136 to the traffic $flow_A$ 134A associated with the $cell_A$ 112A to mitigate the cell $load_A$ 128A to below the congestion threshold 132.

From operation 214, the method 200 proceeds to operation 216, where the method 200 ends.

Figure 3:
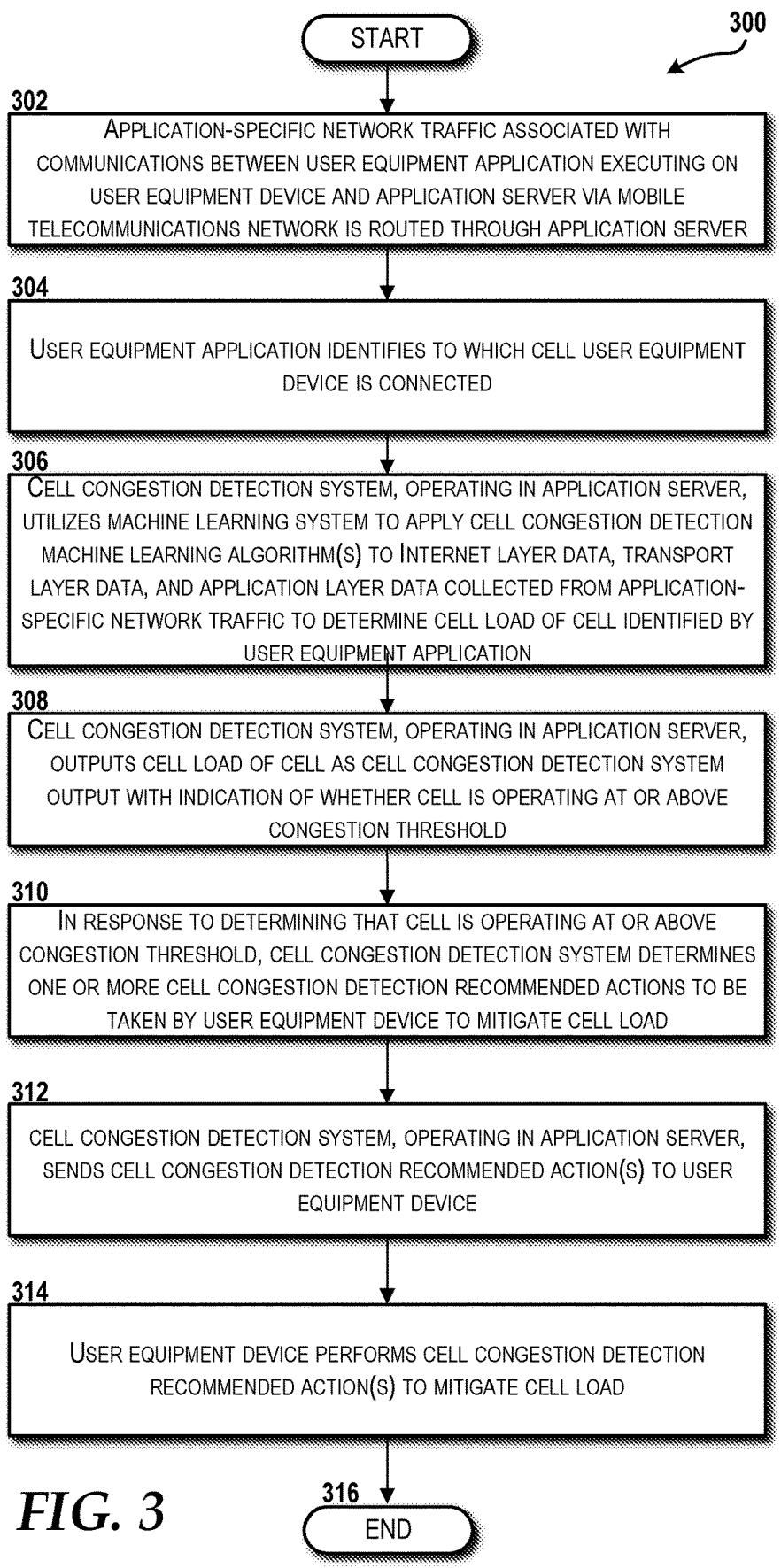
FIG. 3 is a flow diagram illustrating aspects of a method for collective intelligence-based cell congestion detection in a mobile telecommunications network based upon a cell congestion detection system operating in an application server, according to an illustrative embodiment.

Turning now to FIG. 3, a method 300 for collective intelligence-based cell congestion detection in the mobile telecommunications network 102 based upon the CCD system 116 operating in the application server 138 will be described according to an illustrative embodiment. The method 300 will be described with reference to FIG. 3 and further reference to FIG. 1B.

The method 300 begins and proceeds to operation 302, where the application-specific network traffic 142 associated with communications (e.g., requests/responses, messages, data, other communications, and the like) between the UE application 140, executing on the UE device 104, and the application server 138 via the mobile telecommunications network 102 are routed through the application server 138. From operation 302, the method 300 proceeds to operation 304, where the UE application 140, being executed by the UE device 104, identifies to which cell 112 the UE device 104 is connected—for example, the $UE_1$ 104A is connected to the $cell_A$ 112A in FIG. 1B—and can provide the cell ID or other information to inform the application server 138 of the cell 112 to which the UE device 104 is connected.

From operation 304, the method 300 proceeds to operation 306, where the application server 138 utilizes the machine learning system 126 to apply the CCD machine learning algorithm(s) 127 to the Internet layer data 120, the transport layer data 122, and the application layer data 124 collected from the application-specific network traffic 142 to determine the cell load 128 corresponding to the cell 112. From operation 306, the method 300 proceeds to operation 308, where the CCD system 116 outputs the cell load 128 as the CCD system output 130 with an indication of whether the cell 112 is operating at or above the congestion threshold 132.

From operation 308, the method 300 proceeds to operation 310, where, in response to determining that the cell 112 is operating with the cell load 128 at or above the congestion threshold 132, the CCD system 116 determines one or more CCD recommended actions 144 to be taken by the UE device 104 to mitigate the cell load 128, such as to reduce the cell load 128 below the congestion threshold 132. From operation 310, the method 300 proceeds to operation 312, where the CCD system 116 sends the CCD recommended action(s) 144 to the UE device 104. From operation 312, the method 300 proceeds to operation 314, where the UE device 104 performs the CCD recommended action(s) 144 to mitigate the cell load 128, thereby improving the QoE for users of the application service provided by the application server 138 via the UE application 140 executed by the UE device 104. From operation 314, the method 300 proceeds to operation 316, where the method 300 ends.

Figure 4:
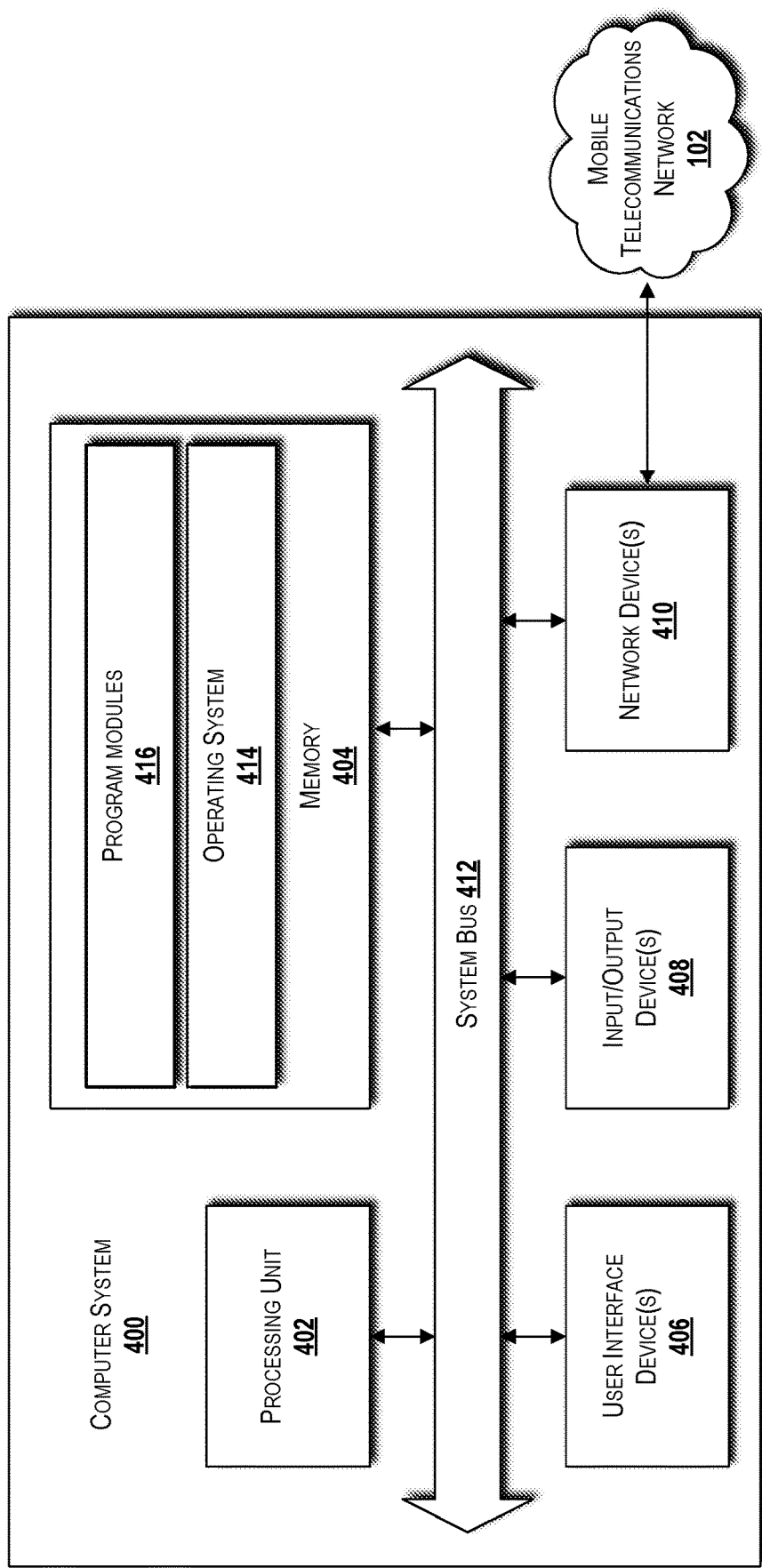
FIG. 4 is a block diagram illustrating an example computer system, according to some illustrative embodiments.

Turning now to FIG. 4, a block diagram illustrating a computer system 400 configured to provide the functionality described herein in accordance with various embodiments of the concepts and technologies disclosed herein. In some embodiments, one or more elements of the mobile telecommunications network 102, the UE(s) 104, one or more elements of the RAN 106, the base station 108, one or more elements of the core network 110, the core network element 114, the CCD system 116, the machine learning system 126, and/or the application server 138 can be configured like and/or can have an architecture similar or identical to the computer system 400 described herein with respect to FIG. 4. It should be understood, however, any of these systems, devices, or elements may or may not include the functionality described herein with reference to FIG. 4.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system 400.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules described herein. By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer to output data.

The network devices 410 enable the computer system 400 to communicate with other networks or remote systems via one or more networks, such as the mobile telecommunications network 102, the RAN 106, and/or the core network 110. Examples of the network devices 410 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 5:
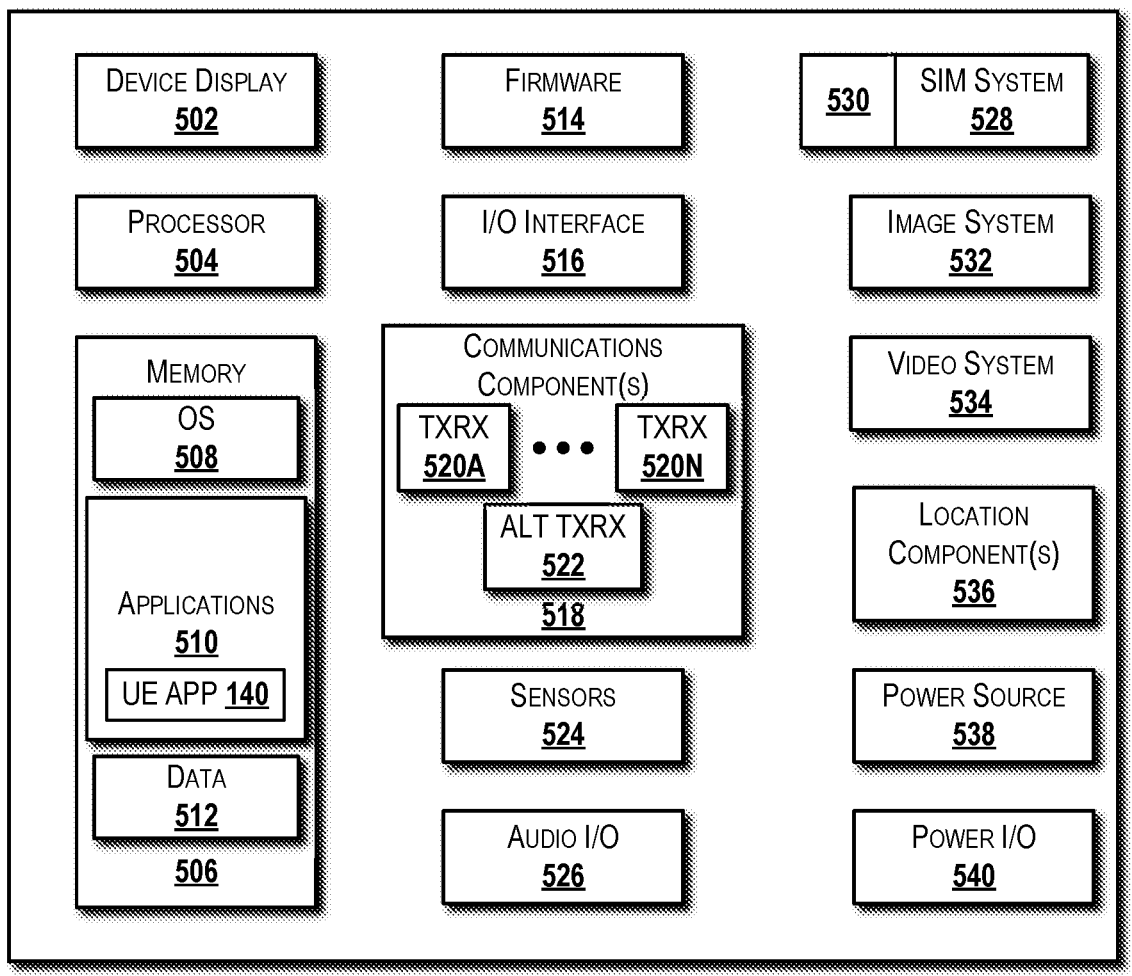
FIG. 5 is a block diagram illustrating an example mobile device, according to some illustrative embodiments.

Turning now to FIG. 5, an illustrative mobile device 500 and components thereof will be described. In some embodiments, the UE devices 104 described above with reference to FIGS. 1A and 1B can be configured as and/or can have an architecture similar or identical to the mobile device 500 described herein with respect to FIG. 5. It should be understood, however, that the UE devices 104 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a device display 502 for displaying data. According to various embodiments, the device display 502 can be configured to display any information. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting with data. The UI application can be executed by the processor 504 to aid a user in answering/initiating calls, entering/deleting other data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500.

According to various embodiments, the applications 510 can include, for example, the UE application 140, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It should be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the mobile telecommunications network 102. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMAONE, CDMA2000, LTE, and various other 2G, 2.5G, 3G, 4G, 5G and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSDPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. One or more of the sensors 524 can be used to detect movement of the mobile device 500. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, CCDs, combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a specific location of the mobile device 500. According to various embodiments, the location components 536 can send and/or receive signals from GPS devices, A-GPS devices, WI-FI/WIMAX and/or cellular network triangulation data, combinations thereof, and the like. The location component 536 also can be configured to communicate with the communications component 518 to retrieve triangulation data from the mobile telecommunications network 102 for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
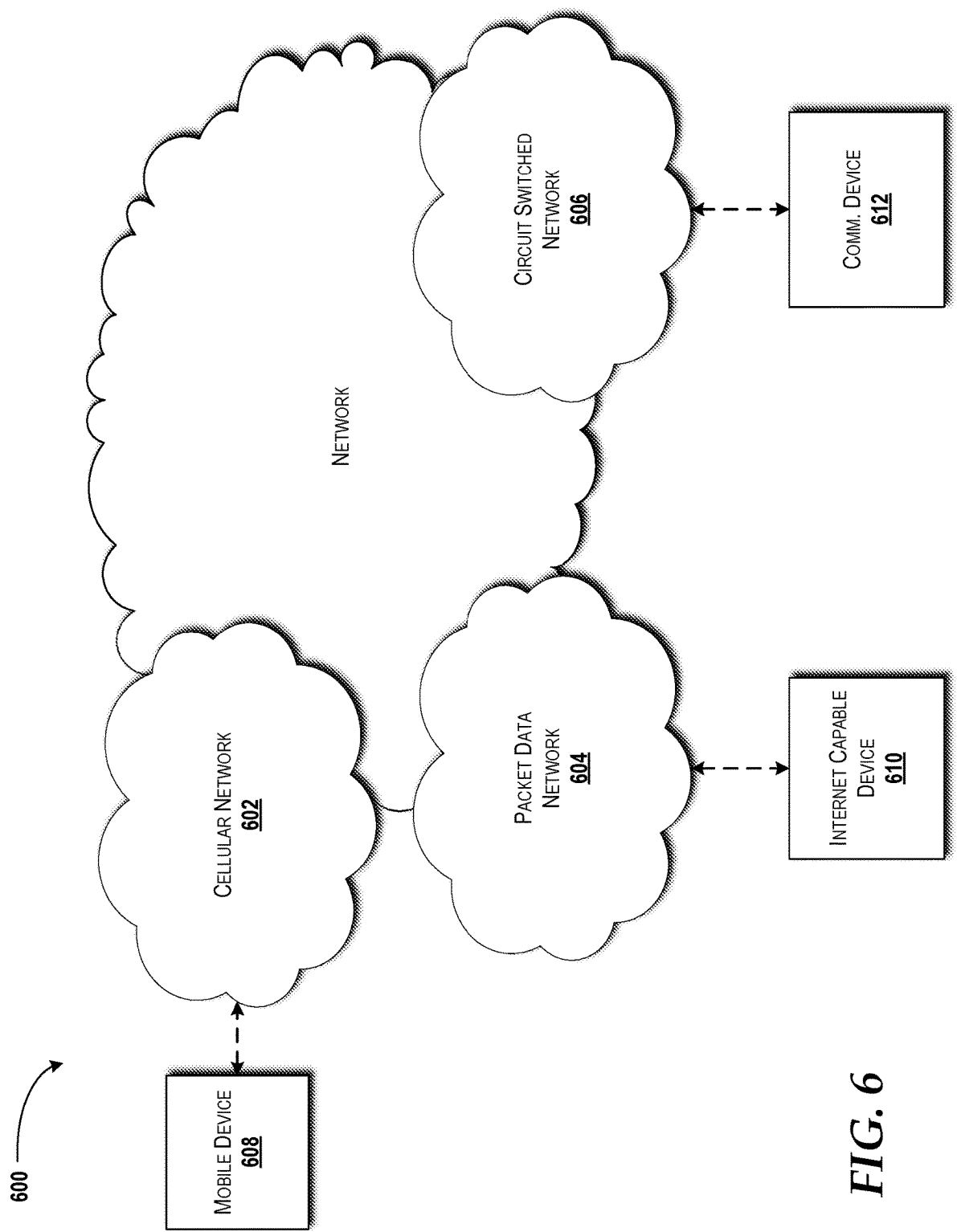
FIG. 6 schematically illustrates a network, according to an illustrative embodiment.

Turning now to FIG. 6, additional details of an embodiment of the network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the UE device 104, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards. In some embodiments, the mobile telecommunications network 102 can be configured like the cellular network 602.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet.

The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 608, for example, the UE device 104, a personal computer ("PC"), a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. It should be appreciated that substantially all of the functionality described with reference to the other network 112 can be performed by the cellular network 602, the packet data network 604, and/or the circuit switched network 606, alone or in combination with additional and/or alternative networks, network elements, and the like.

Figure 7:
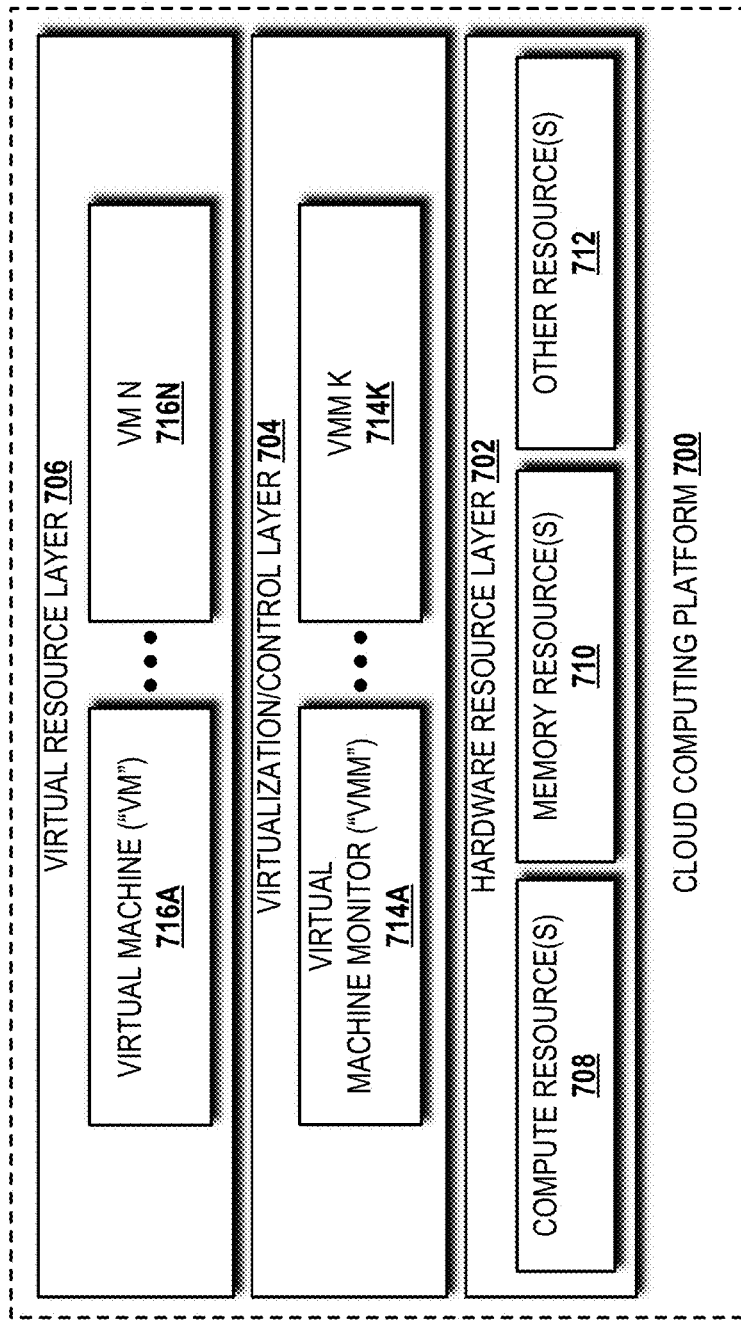
FIG. 7 is a block diagram illustrating a cloud computing platform capable of implementing aspects of the concepts and technologies disclosed herein.

Turning now to FIG. 7, a cloud computing platform 700 capable of implementing aspects of the concepts and technologies disclosed herein will be described, according to an illustrative embodiment. In some embodiments, the core network element 114, the CCD system 116, the machine learning system 126, and/or the application server 138 can be implemented, at least in part on the cloud computing platform 700. Those skilled in the art will appreciate that the illustrated cloud computing platform 700 is a simplification of but one possible implementation of an illustrative cloud computing environment, and as such, the cloud computing platform 700 should not be construed as limiting in any way.

The illustrated cloud computing platform 700 includes a hardware resource layer 702, a virtualization/control layer 704, and a virtual resource layer 706 that work together to perform operations as will be described in detail herein. While connections are shown between some of the components illustrated in FIG. 7, it should be understood that some, none, or all of the components illustrated in FIG. 7 can be configured to interact with one other to carry out various functions described herein. In some embodiments, the components are arranged so as to communicate via one or more networks (not shown). Thus, it should be understood that FIG. 7 and the following description are intended to provide a general understanding of a suitable environment in which various aspects of embodiments can be implemented, and should not be construed as being limiting in any way.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Figure 8:
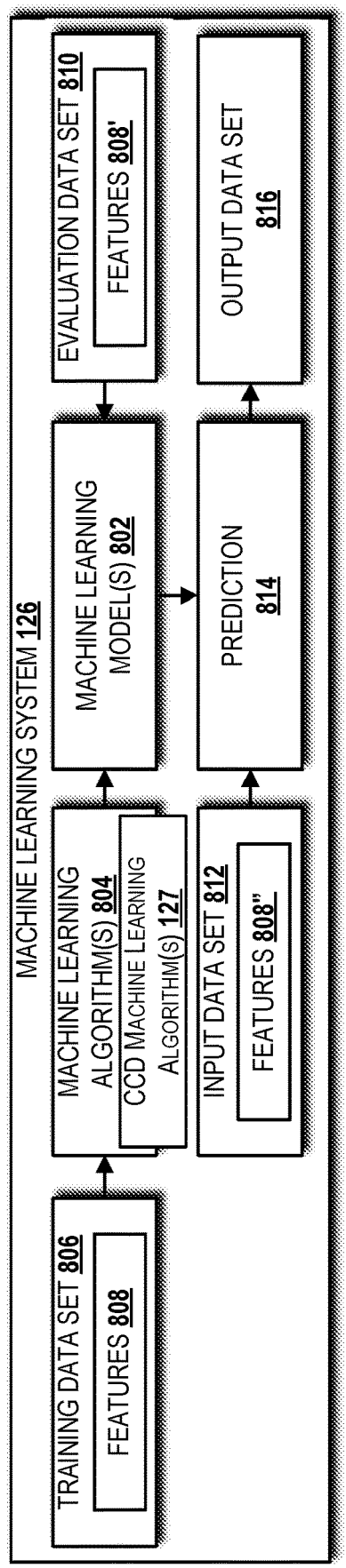
FIG. 8 is a block diagram illustrating a machine learning system capable of implementing aspects of the concept and technologies disclosed herein.

Turning now to FIG. 8, an illustrative embodiment of the machine learning system 126 capable of implementing aspects of the embodiments disclosed herein will be described. The illustrated machine learning system 126 includes one or more machine learning models 802. The machine learning model(s) 802 can be created by the machine learning system 126 based upon one or more machine learning algorithms 804, including the CCD machine learning algorithms 127. In some embodiments, the CCD machine learning algorithm 127 is a random forest algorithm. In testing, the random forest algorithm yielded the highest accuracy with existing data. It should be understood, however, that the CCD machine learning algorithm 127 is not limited to the random forest algorithm or any other specific machine learning algorithm 127 and can be selected based upon the needs of a given implementation. The machine learning algorithm(s) 804 can be based upon any existing, well-known algorithm, any proprietary algorithms, or any future machine learning algorithm. Some example machine learning algorithms 804 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 804 based upon the problem(s) to be solved by machine learning via the machine learning system 126.

The machine learning system 126 can control the creation of the machine learning models 802 via one or more training parameters. In some embodiments, the training parameters are selected modelers at the direction of a mobile network operator, for example. Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater the number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 126 avoid this overfitting/memorization problem by adjusting extreme weight values of the features 808. For example, a feature that has a small weight value relative to the weight values of the other features in the training data set 806 can be adjusted to zero.

The machine learning system 126 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 126 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that aspects of collective intelligence-based cell congestion detection in mobile telecommunications networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   routing, by a cell congestion detection system comprising a processor, at least a portion of network traffic that is associated with a plurality of user equipment devices through a core network element of a mobile telecommunications network, wherein the core network element identifies, to the cell congestion detection system, which traffic flows of at least the portion of the network traffic are from which cells of the mobile telecommunications network;
   collecting, by the cell congestion detection system, from at least the portion of the network traffic, Internet layer data, transport layer data, and application layer data;
   determining, by the cell congestion detection system via execution, by the processor, of a machine learning algorithm applied to the Internet layer data, the transport layer data, and the application layer data, a cell load of at least one cell of the cells; and
   determining, by the cell congestion detection system, based upon the cell load, whether the at least one cell is congested.

2. The method of claim 1, wherein the cell congestion detection system is operating in the core network element.

3. The method of claim 1, further comprising:
   determining, by the cell congestion detection system, that the cell load is at or above a congestion threshold; and
   in response to determining that the cell load is at or above the congestion threshold, applying a traffic treatment to a specific traffic flow that is associated with the at least one cell to mitigate the cell load.

4. The method of claim 1, wherein the cell congestion detection system is operating in an application server.

5. The method of claim 1, further comprising:
   determining, by the cell congestion detection system, that the cell load is at or above a congestion threshold; and
   in response to determining that the cell load is at or above the congestion threshold, determining a recommended action to be taken by at least one of the plurality of user equipment devices to mitigate the cell load.

6. A cell congestion detection system comprising:
   a processor; and
   a memory that stores instructions that, when executed by the processor, cause the processor to perform operations comprising
      routing at least a portion of network traffic that is associated with a plurality of user equipment devices through a core network element of a mobile telecommunications network, wherein the core network element identifies, to the cell congestion detection system, which traffic flows of at least the portion of the network traffic are from which cells of the mobile telecommunications network, collecting, from at least the portion of the network traffic, Internet layer data, transport layer data, and application layer data, determining, via execution of a machine learning algorithm applied to the Internet layer data, the transport layer data, and the application layer data, a cell load of at least one cell of the cells, and determining, based upon the cell load, whether the at least one cell is congested.

7. The cell congestion detection system of claim 6, wherein the cell congestion detection system is operating in the core network element of the mobile telecommunications network.

8. The cell congestion detection system of claim 6, wherein the operations further comprise:
    determining that the cell load is at or above a congestion threshold; and
    in response to determining that the cell load is at or above the congestion threshold, applying a traffic treatment to a specific traffic flow that is associated with the at least one cell to mitigate the cell load.

9. The cell congestion detection system of claim 6, wherein the cell congestion detection system is operating in an application server.

10. The cell congestion detection system of claim 6, wherein the operations further comprise:
    determining that the cell load is at or above a congestion threshold; and
    in response to determining that the cell load is at or above the congestion threshold, determining a recommended action to be taken by at least one of the plurality of user equipment devices to mitigate the cell load.

11. A computer storage medium comprising computer-executable instructions that, when executed by a processor of a cell congestion detection system, cause the processor to perform operations comprising:
    routing at least a portion of network traffic that is associated with a plurality of user equipment devices through a core network element of a mobile telecommunications network, wherein the core network element identifies, to the cell congestion detection system, which traffic flows of at least the portion of the network traffic are from which cells of the mobile telecommunications network;
    collecting, from at least the portion of the network traffic, Internet layer data, transport layer data, and application layer data;
    determining, via execution of a machine learning algorithm applied to the Internet layer data, the transport layer data, and the application layer data, a cell load of at least one cell of the cells; and
    determining, based upon the cell load, whether the at least one cell is congested.

12. The computer storage medium of claim 11, wherein the cell congestion detection system is operating in a core network element of the mobile telecommunications network.

13. The computer storage medium of claim 12, wherein the operations further comprise:
    determining that the cell load is at or above a congestion threshold; and
    in response to determining that the cell load is at or above the congestion threshold, applying a traffic treatment to a specific traffic flow that is associated with the at least one cell to mitigate the cell load.

14. The computer storage medium of claim 11, wherein the cell congestion detection system is operating in an application server; and wherein the operations further comprise:
    determining that the cell load is at or above a congestion threshold; and
    in response to determining that the cell load is at or above the congestion threshold, determining a recommended action to be taken by at least one of the plurality of user equipment devices to mitigate the cell load.

* * * * *